(12) United States Patent
Vervoort et al.

(10) Patent No.: US 11,577,589 B2
(45) Date of Patent: Feb. 14, 2023

(54) OPEN ROOF ASSEMBLY FOR USE IN A VEHICLE AND A METHOD FOR OPERATING SAME

(71) Applicant: Inalfa Roof Systems Group B.V., Oostrum (NL)

(72) Inventors: Mark Peter Anton Vervoort, Horst (NL); Perry Johan Jacob Lambert Van Vegchel, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/105,130

(22) Filed: Nov. 25, 2020

(65) Prior Publication Data

US 2021/0162845 A1 Jun. 3, 2021

(30) Foreign Application Priority Data

Nov. 28, 2019 (EP) .................................... 19212229

(51) Int. Cl.
*B60J 7/057* (2006.01)
*B60J 7/043* (2006.01)

(52) U.S. Cl.
CPC ........... *B60J 7/0573* (2013.01); *B60J 7/0435* (2013.01)

(58) Field of Classification Search
CPC .......... B60J 7/02; B60J 7/0435; B60J 7/0573; H02K 7/116; Y10T 477/327;
(Continued)

(56) References Cited

U.S. PATENT DOCUMENTS

2015/0038291 A1 5/2015 Kenichi
2015/0360545 A1* 12/2015 Nania .................... B60J 7/0573
296/223

FOREIGN PATENT DOCUMENTS

DE 19635741 A1 * 3/1997 ............. E05B 77/12
DE 19611578 A1 * 9/1997 ............. E05B 77/26
(Continued)

OTHER PUBLICATIONS

Ryosuke, "Occupant Escape Assist Device", May 8, 2008, Japanese Patent Office, JP2008105456 (Year: 2008).*
(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

An open roof assembly for use in a vehicle roof of a vehicle comprises a moveably arranged closure member for selectively covering or at least partially exposing an opening in the vehicle roof. Further, an electric motor operatively coupled to the closure member is provided for moving the closure member. A control unit is operatively coupled to the electric motor for controlling the closure member. The control unit is configured to control a position of the closure member during normal driving conditions, and to release control of the position of the closure member, when a vehicle acceleration exceeds a predetermined acceleration threshold. Thus, upon a high force on the closure member, induced by the high acceleration and weight of the closure member, damage may be prevented by absorbing the high forces in a motion of the closure member and a resistance of the electric motor.

15 Claims, 4 Drawing Sheets

(58) Field of Classification Search
CPC ......... E05Y 2201/216; E05Y 2201/654; E05Y 2900/54; E05Y 2800/40; E05Y 2800/412; E05Y 2201/23; E05Y 2201/26; E05Y 2201/238; E05Y 2201/242; E05Y 2201/262; E05Y 2800/254; E05Y 2400/00; E05Y 2400/10; E05Y 2400/57; E05Y 2400/564; E05F 15/692
USPC ............................................ 296/223; 477/13
See application file for complete search history.

(56) References Cited

FOREIGN PATENT DOCUMENTS

| DE | 102012011117 A1 | * | 12/2013 | ............. E05F 15/41 |
|----|-----------------|---|---------|--------------------------|
| DE | 112013001891 T5 |   | 12/2014 |                          |
| DE | 102014009809 B3 |   | 12/2015 |                          |
| EP | 0900679 A2      |   | 3/1999  |                          |
| EP | 3453931 B1      | * | 10/2019 | ............. E05F 15/40 |
| JP | 2008105456 A    | * | 5/2008  |                          |

OTHER PUBLICATIONS

Schulte, "Vehicle Door Drive Assembly", Mar. 13, 2019, European Patent Office, EP3453931 (Year: 2019).*

Hartmann et al., "Adjusting system for vehicle, has evaluation and control unit which selects one threshold curve of several threshold curves stored in memory unit for comparing with current motion state in response to selection parameters", Dec. 5, 2013, German Patent Office (Year: 2013).*

Kagleder, "Electric window raising circuit arrangement with mechanical child-protection system for rear-door windows", Sep. 25, 1997, Publisher: German Patent Office/European Patent Office, Edition DE19611578A1 (Year: 1997).*

Aoki et al., "Unlocking device for door lock of vehicle", Mar. 6, 1997, Publisher: German Patent Office/European Patent Office, Edition: DE19635741A1 (Year: 1997).*

European Search Report for European Patent Application No. 19212229.9, dated Jun. 5, 2020.

* cited by examiner

OPEN ROOF ASSEMBLY FOR USE IN A VEHICLE AND A METHOD FOR OPERATING SAME

BACKGROUND

The discussion below is merely provided for general background information and is not intended to be used as an aid in determining the scope of the claimed subject matter.

The invention relates to an open roof assembly for use in a vehicle roof of a vehicle.

An open roof assembly for use in a vehicle roof of a vehicle is known. In particular, in a known open roof assembly, a moveably arranged closure member is provided for selectively covering an opening in the vehicle roof or at least partially exposing such opening. An electric motor may be provided and be operatively coupled to the closure member for moving the closure member between a closed position, in which the opening is covered, and an open position, in which the opening is at least partly exposed. Further, a control unit may be provided operatively coupled to the electric motor for controlling a position and motion of the closure member.

Under normal driving conditions, the control unit is configured to maintain control over the electric motor and thus over the closure member. Such control includes, but is not limited to, controlling a position both in stationary conditions, e.g. in a fully open position, and in moving conditions, e.g. when moving from the open position to the closed position. Hence, the control unit is configured to ensure that the closure member is not moving uncontrollably.

Under exceptional circumstances, for example during a crash of the vehicle, inertia of the closure member may induce an exceptionally high force. Such a force may result in damage to the open roof assembly, e.g. a drive system provided between the electric motor and the closure member as such drive system needs to absorb such forces. Moreover, additional measures may be needed in the drive system to prevent that the closure member may break free from the drive system. Such measures may result in additional costs and weight of the open roof system.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, an open roof assembly comprises a moveably arranged closure member for selectively covering or at least partially exposing an opening in the vehicle roof; an electric motor operatively coupled to the closure member for moving the closure member and a control unit operatively coupled to the electric motor. In the open roof assembly, the control unit is configured to control a position of the closure member during normal driving conditions, and release control of the position of the closure member, when a vehicle acceleration exceeds a predetermined acceleration threshold.

In order to relieve the requirements of the drive assembly, under the exceptional circumstances, wherein a high acceleration occurs, the control unit releases the control over the electric motor and the closure member. Thus, the closure member is enabled to move. Still, a significant friction force, e.g. the friction of the drive assembly, is present. The high force of inertia under high acceleration is thus absorbed by accelerating the closure member, by the friction in the drive system and by friction in a mechanical guide assembly supporting the closure member and a speed of the uncontrolled motion of the closure member remains limited. Further, the friction in the assembly may ensure that a motion of the closure member is stopped soon.

In an embodiment, the control unit is further configured to monitor the position of the closure member, while the control of the position is released. Although the control unit may release the control, e.g. enabling that the electric motor is free to rotate, the control unit may still monitor a rotation of the electric motor and derive from such rotation an actual position of the closure member. Based on such actual position the control unit may be configured to perform any suitable action.

In an embodiment, the control unit is further configured to, after release of the control, stop a motion of the closure member. After releasing the control, a motion of the closure member may be stopped, e.g. by activating a braking mechanism, such to reduce a travel of the closure member.

In an embodiment, the control unit is further configured to regain control of the position of the closure member after releasing the control. Of course, after having released the control, the control may be regained. For example, as above-described, the control unit may regain control to stop an uncontrolled motion of the closure member. Thus, e.g. upon a crash of the vehicle, the closure member is allowed to start moving, thereby absorbing an amount of energy of the inertia, and then the motion is stopped by regaining control and stopping the motion. In a particular embodiment, the control unit, upon regaining the control of the position, controls corresponding to an actual motion of the closure member and then controls a change in the motion. So, to reduce a strain on the drive assembly further, the control unit is configured to monitor a motion, in particular a speed of the uncontrolled motion, and, upon regaining control, to reduce the speed in a controlled, e.g. gradual, manner.

In an embodiment, the open roof assembly comprises an acceleration sensor unit for detecting a vehicle acceleration. In another embodiment, the control unit is operatively coupled to a vehicle control system, the control unit being configured to receive a crash signal from a vehicle crash sensor. In either embodiment, the control unit is configured to receive a signal representing the vehicle acceleration based on which the control unit is configured to determine whether the predetermined acceleration threshold is exceeded. In the first mentioned embodiment, the control unit may continually receive a signal indicating the vehicle acceleration based on which the control unit may decide whether the acceleration threshold is exceeded, while in the second mentioned embodiment, the crash sensor may have determined that the acceleration threshold is exceeded and the control unit merely responds to the signal indicating that the acceleration threshold has been exceeded.

It is noted that the acceleration threshold may be determined based on the properties of the open roof assembly and in particular based on an acceleration value for which it has been determined that the drive assembly may be damaged, if the closure member is not released from the control by the control unit. The acceleration threshold may in another embodiment be determined as a generic threshold that is, for example, determined based on an exceptional acceleration that is not achievable by the vehicle under normal driving conditions. The person skilled in the art is enabled to consider and decide on a suitable threshold value.

In an embodiment, a drive assembly is operatively arranged between the electric motor and the closure member and wherein the drive assembly comprises at least one of a drive cable and a gearing assembly. A drive cable and a gearing assembly are susceptible to damage under high load. In particular, the drive cable used in a known open roof assembly is formed from a metal, spiral wire to provide for flexibility, while also enabling to push and to pull. Such a drive cable may relatively easily stretch and deform under high pulling loads.

In an embodiment, the control unit is configured to release the control of the position in dependence of the actual position of the closure member. In particular, if the closure member is in a position where only a small gap exists between an edge of the closure member and an edge of the opening in the vehicle roof, releasing the control may result in other damage. For example, the edge of the closure member may crash on the edge of the opening potentially leading to damage to either or both of the closure member and the edge of the opening. To prevent such other damage, the control unit may be configured to maintain control over the closure member, even when the vehicle acceleration exceeds the predetermined acceleration threshold.

In an aspect, the present invention further provides a method of operating an open roof assembly. The open roof assembly comprises a moveably arranged closure member for selectively covering or at least partially exposing an opening in the vehicle roof, an electric motor operatively coupled to the closure member for moving the closure member and a control unit operatively coupled to the electric motor. The method comprises the control unit performing the steps of controlling a position of the closure member during normal driving conditions; and releasing the control of the closure member, when a vehicle acceleration exceeds a predetermined acceleration threshold.

In an embodiment of the method, the method further comprises the control unit performing the step of stopping a motion of the closure member after having released the control of the closure member.

In an embodiment of the method, the method further comprises the control unit performing the step of regaining control of the position of the closure member after releasing the control. Such regaining of the control may be performed in order to stop an undesired motion due to the preceding release of the control or may just be to operate and control the open roof assembly under normal driving conditions, again.

In a further aspect, the present invention provides a computer software product comprising computer readable and executable instructions for instructing a computer processor to perform the method according to the present invention. In particular, such computer processor may be comprised in a control unit of an open roof assembly.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

DETAILED DESCRIPTION OF THE ILLUSTRATIVE EMBODIMENT

The present invention will now be described with reference to the accompanying drawings, wherein the same reference numerals have been used to identify the same or similar elements throughout the several views.

Figure 1A:
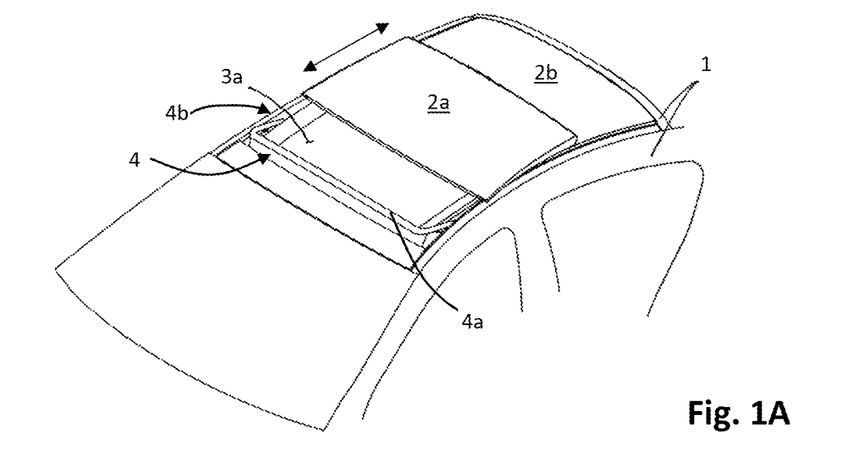
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
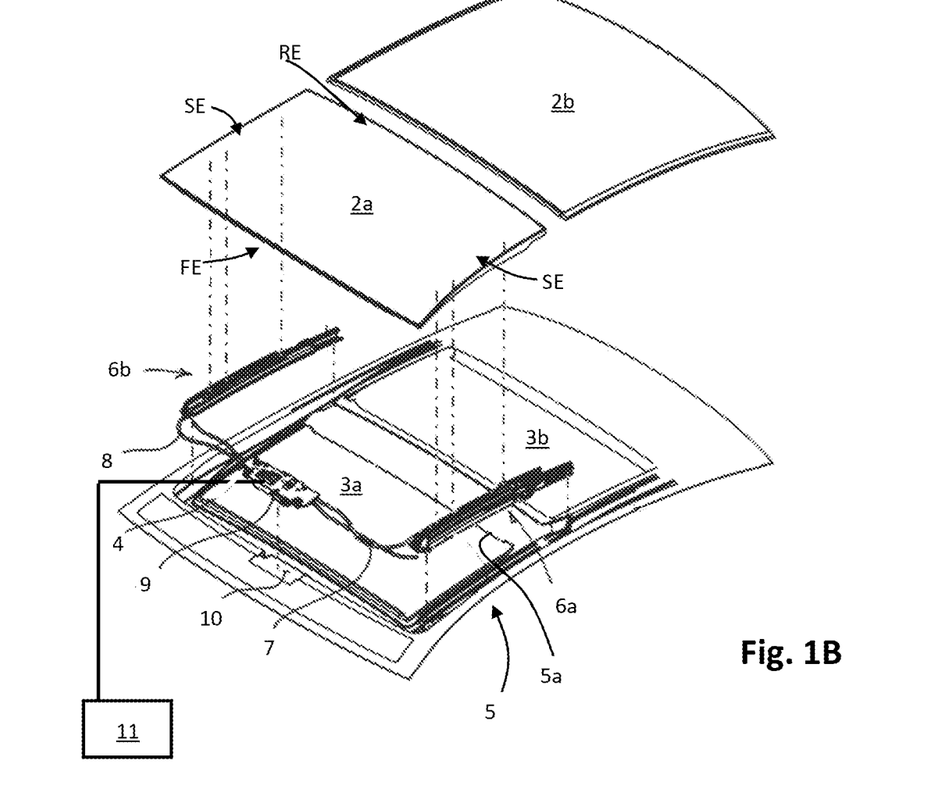
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end (FE) of the moveable panel 2a at a recess 10. In another embodiment, the drive motor 9 may be positioned at any other suitable position or location. For example, the drive motor 9 may be arranged near or below the rear end (RE) of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2:
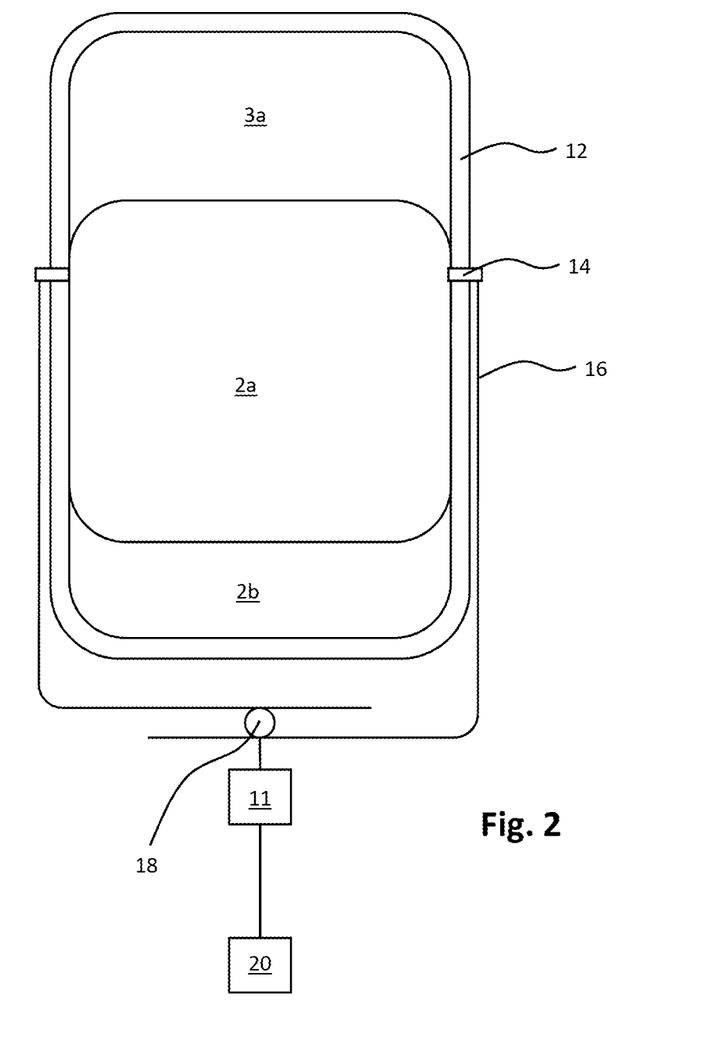
FIG. 2 shows a top view of an embodiment of an open roof assembly with a moveable closing member and a corresponding drive assembly.

FIG. 2 schematically illustrates an open roof assembly with a drive assembly. The open roof assembly comprises the moveable closure member 2a for closing the first roof opening 3a, the fixed panel 2b and a support frame 12. The support frame 12 is arranged and configured to mount and support the open roof assembly on a body frame of a vehicle. In FIG. 2, the moveable closure member 2a is schematically coupled to a drive cable 16 through a coupling element 14. In practice and as illustrated in FIGS. 1A and 1B, the moveable closure member 2a is arranged on the support frame 12 through the guide assemblies 6a, 6b and each guide assembly 6a, 6b is operated through an associated drive cable 16. In the illustrated embodiment, the drive cable 16 is moveable through an operative, mechanical coupling to a suitable gear wheel 18.

The gear wheel 18 is mechanically coupled to the drive motor 9, which is operatively coupled to the control unit 11. The control unit 11 may comprise electronic control circuitry.

In accordance with the present invention, the electronic control circuitry is coupled to or comprises a sensor 20, in particular an acceleration sensor or a crash sensor. The sensor 20 may thus be configured to provide an acceleration signal to the control unit 11 such that the control unit 11 may be configured to derive whether the vehicle acceleration exceeds a predetermined acceleration threshold, which may be digitally stored in a suitable memory provided in the control unit 11, for example.

When driving, i.e. under normal driving conditions, the control unit 11 controls the closure member 2a, in particular the control unit 11 controls a motion of the closure member 2a and controls the closure member 2a to hold its position, when the closure member 2a is not operated. Thereto, the control unit 11 controls the electric motor 9 that is operatively coupled to the gear wheel 18. It is noted that between the electric motor and the gear wheel 18 further gearings may be provided. The gear wheel 18 is configured and arranged to interact with the drive cable 16 such to move the drive cable 16 for moving the closure member 2a.

Different driving arrangements and circuitry for driving the electric motor are known. The present invention is not limited to any particular driving arrangement or circuitry. For example, the electric motor may be driven by operating a relay for supplying a supply voltage, or not, thereby switching the electric motor between two modes: on or off. In another embodiment, the electric motor may be driven by a pulsed supply signal, wherein a pulse width modulation may be employed to control a rotation speed of the electric motor. Other driving arrangements and methods are known to the person skilled in the art and are not further elucidated herein.

For holding the closure member 2a in its position, a mechanical brake assembly may be provided and controlled by the control unit 11 for holding the closure member in position, when the closure member 2a is not being moved. More commonly, the electric motor is controlled by the control unit 11 such that the electric motor does not rotate.

For example, short-circuiting the electric motor functions as a brake on the electric motor. So, the control unit 11 and the related drive circuitry may be configured for short-circuiting the electric motor in order to control and maintain a position of the closure member 2a. In another embodiment, a closed-loop position control method may be applied to control both a motion and a stationary position of the closure member 2a. Other embodiments may be employed as well. It is noted that the present invention is not limited to any one of such embodiments.

When the vehicle acceleration exceeds the predetermined acceleration threshold, e.g. upon a crash, the acceleration of the weight of the closure member 2a induces a relatively large force on the closure member 2a. It is noted that the acceleration as used herein is to be considered as an absolute value. Hence, while a deceleration may be considered as an acceleration having a negative value, the absolute value of the deceleration is to be considered as the acceleration as used herein. If the closure member 2a would be controlled to maintain its position, the force would need to be absorbed by the drive assembly, which in the shown embodiment comprises the drive cable 16 and the gearing 18. The drive assembly may be designed such that the drive assembly is capable to withstand such large force. In any case, the drive assembly is preferably designed such that the drive assembly does not break. Still, in order to prevent damage to the drive assembly, like stretching of the drive cable 16, the open roof assembly is configured to release the control over the closure member 2a such to allow the closure member 2a to move in response to the induced force. Then, such large force may be absorbed in the motion of the closure member 2a and a resistance in the electric motor, for example.

The method, as executed by the control unit 11 of the open roof assembly, is described with reference to FIGS. 3A and 3B.

Figure 3A:
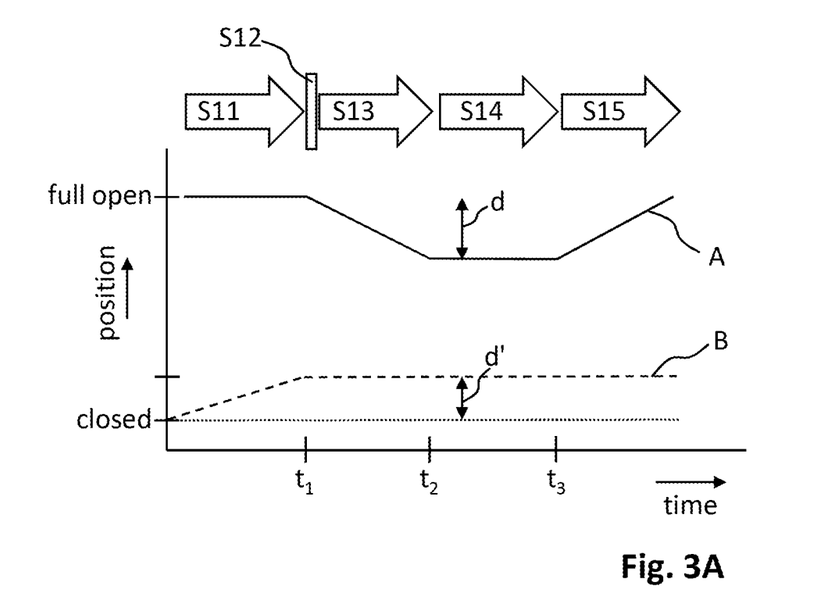
FIGS. 3A and 3B show a timing diagram and a flow diagram, respectively, illustrating an embodiment of a method.
Figure 3B:
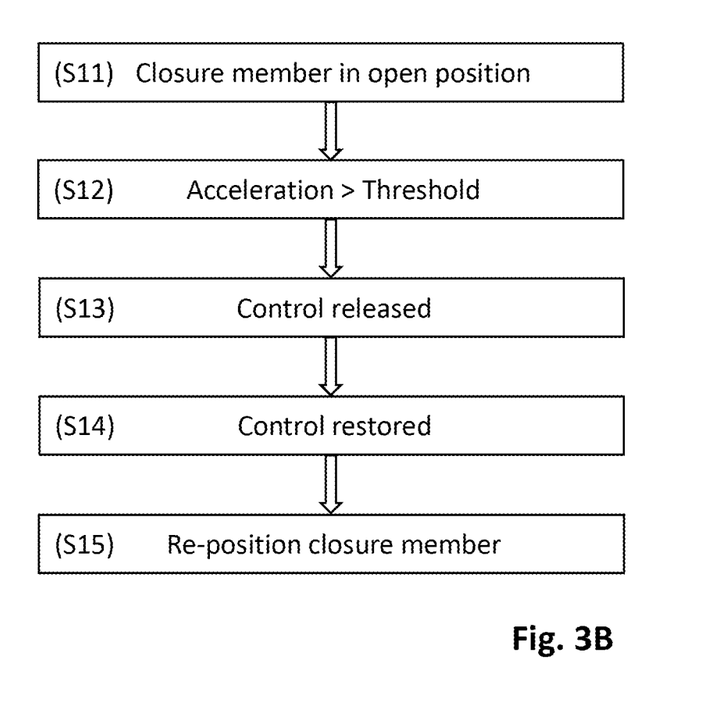
Figure 3C:
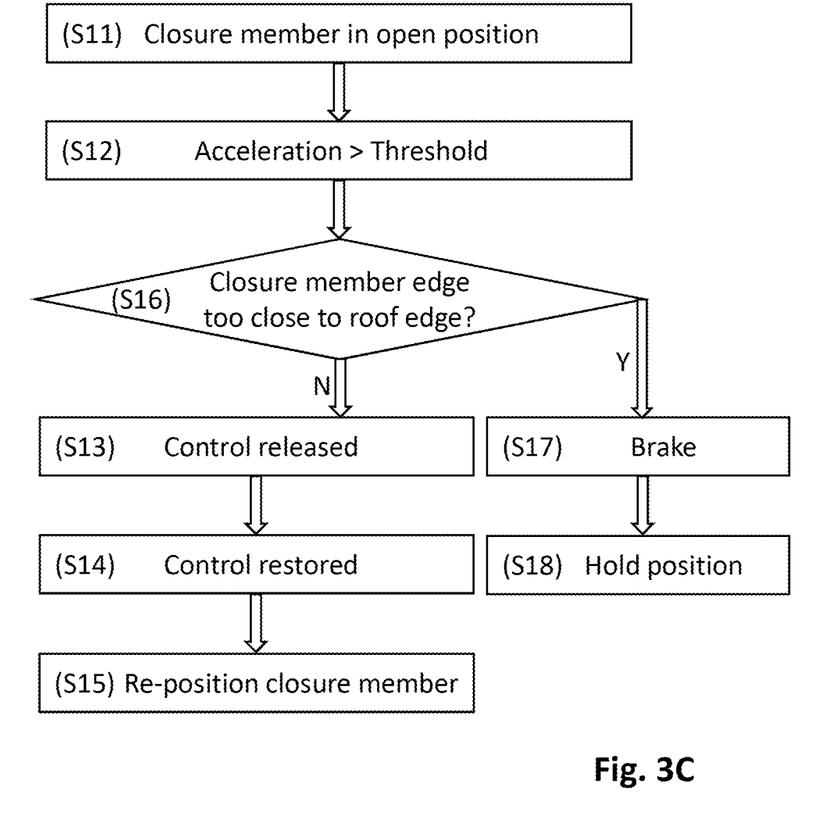
FIG. 3C shows a flow diagram of the sequential steps of a second embodiment of the method.

In FIGS. 3A-3C, two embodiments of the present invention are illustrated, wherein FIG. 3A shows a timing diagram for both embodiments, FIG. 3B shows a flow diagram of the sequential steps of a first embodiment of the method. The sequence of steps is also indicated in FIG. 3A. FIG. 3C shows a flow diagram of the sequential steps of a second embodiment of the method.

The vertical axis of the timing diagram of FIG. 3A represents a position of the closure member, wherein the position lies between a closed position and a fully open position. A first curve A illustrates the operation of the method when the closure member is in the fully open position, when an excessive acceleration is detected and a second curve B illustrates the operation of the method when the closure member is in a partially open position close to the closed position, when an excessive acceleration is detected.

Referring to both FIGS. 3A and 3B and with reference to the curve A, in a first step S11 of the method, the closure member is in the fully open position. The closure member may be stationary in such position and the control unit controls the closure member accordingly.

At time $t_1$, in a second step S12 of the method, an excessive acceleration is detected and the method immediately goes to a third step S13 of the method. In the third step S13, the control unit releases the control over the closure member. As a consequence and due to the force generated the closure member starts to move towards the closed position.

At time $t_2$, the control unit restores its control over the position of the closure member in a fourth step S14. The timing may be based on any suitable criterion, for example on a predetermined time period, a developed speed of the closure member, a distance travelled by the closure member or the acceleration having reduced to a value below a second predetermined threshold. Any combination of criterions may be employed as well. For example, multiple criterions may be imposed and the control may be restored if any one of the criterions is met and/or if a certain predetermined combination of criterions is met. In the illustrated example of the curve A, the control is restored at time $t_2$, at which time the closure member has travelled over a distance d.

In the illustrated embodiment, upon restoring the control in the fourth step S14, a motion of the closure member is first stopped and the closure member is held in such position for a certain period of time, wherein the timing may be based on any suitable criterion. For stopping a motion, the control unit may be configured to actuate a braking mechanism, such as the above mentioned mechanical braking mechanism or short-circuiting the electric motor, for example. Other suitable mechanism or methods may be applied as well as the present invention is not limited with respect to method of the restoration of the control.

At time $t_3$, an optional fifth step S15 is initiated, wherein the control unit controls the closure member to return its position where the closure member was at time $t_1$ when the control was released. Executing this fifth step may be conditional. For example, inducing a motion of the closure member may be prohibited until a good condition of the vehicle is detected, e.g. based on a signal received from a vehicle controller, or the like, such to prevent that the closure member unexpectedly starts to attempt to move after a crash of the vehicle. Other conditions may be imposed as well. For example, in another embodiment, after initiation of the fourth step S14 and stopping a motion of the closure member, the control unit may cease any automatic control until a user command is received.

In the second embodiment, if the closure member is at another position at time $t_1$, the method may be executed differently. Referring to FIGS. 3A and 3C, as shown by the second curve B, the closure member may be moving from the closed position to an at least partially open position (cf. first step S11), when the excessive acceleration occurs (cf. second step S12). Then, at time $t_1$, a distance d' between an edge of the closure member and a roof edge of the opening in the vehicle roof is shorter than the distance d (cf. curve A) that the closure member may be expected to travel if the control is released. Thus, releasing the control in accordance with the third step S13 may be expected to result in a crash of the edge of the closure member on the roof edge. This can lead to severe damage and could potentially lead to a pinching of an object between the closure member and the roof edge.

To prevent such undesirable crash or pinching, in this second embodiment of the method, in a decision step S16, it is decided that the closure member is too close to the roof edge and, therefore, to maintain control and put a brake on the closure member, despite a possibility of (minor) damage to the drive assembly, in accordance with a sixth step S17. Then, optionally, in a seventh step S17, the position is maintained. As above described in relation to the fifth step S15, how the open roof assembly is configured to operate after the time $t_3$ is a mere matter of choice and the present invention is not limited to any selected and configured action.

In a particular embodiment, the edge of the closure member may be regarded as too close to the roof edge, if it may be expected that the closure member may move into a safety range. Such a safety range may be defined as a zone adjacent to the roof edge. In the safety range, specific anti-pinch features may be applicable to prevent a pinch of objects. These anti-pinch features usually require that the control unit has control over the motion of the closure member. Therefore, in this embodiment, it may be prevented that the closure member moves into such safety range uncontrollably by deciding that the edge of the closure member is too close to the roof edge (cf. S16) if a distance between the roof edge and the closure member edge is smaller than a sum of the safety range and the expected travel distance d.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly for use in a vehicle roof of a vehicle, the open roof assembly comprising:
   a moveably arranged closure member for selectively covering or at least partially exposing an opening in the vehicle roof,
   an electric motor operatively coupled to the closure member configured to move the closure member, and
   a control unit operatively coupled to the electric motor, wherein the control unit is configured to:
      control a position of the closure member during normal driving conditions through a control of the electric motor, and
      release control of the electric motor and thus of a position of the closure member, when a vehicle acceleration exceeds a predetermined acceleration threshold to allow the closure member to move and thereby rotate the electric motor in response to a force of inertia of the closure member induced by the vehicle acceleration.

2. The open roof assembly according to claim 1, wherein the control unit is further configured to monitor the position of the closure member, while the control of the electric motor is released.

3. The open roof assembly according to claim 1, wherein the control unit is further configured to, after release of the control of the electric motor, stop a motion of the closure member.

4. The open roof assembly according to claim 1, wherein the control unit is further configured to regain control of the electric motor and thus of the position of the closure member after releasing the control of the electric motor.

5. The open roof assembly according to claim 4, wherein the control unit, upon regaining the control of the electric motor and thus of the position of the closure member, controls corresponding to an actual motion of the closure member and then controls a change in the motion.

6. The open roof assembly according to claim 1, wherein the open roof assembly comprises an acceleration sensor unit configured to detect a vehicle acceleration.

7. The open roof assembly according to claim 1, wherein the control unit is operatively coupled to a vehicle control system, the control unit being configured to receive a crash signal from a vehicle crash sensor.

8. The open roof assembly according to claim 1, wherein a drive assembly is operatively arranged between the electric motor and the closure member and wherein the drive assembly comprises at least one of a drive cable and a gearing assembly.

9. The open roof assembly according to claim 1, wherein the control unit is configured to release the control of the electric motor and thus of the position of the closure member in dependence of the actual position of the closure member.

10. A method of operating an open roof assembly, the open roof assembly comprising a moveably arranged closure member for selectively covering or at least partially exposing an opening in a vehicle roof, an electric motor operatively coupled to the closure member for moving the closure member and a control unit operatively coupled to the electric motor, the method comprising the control unit performing the steps of
   during normal driving conditions, controlling a position of the closure member through a control of the electric motor; and
   releasing the control of the electric motor and thus of the closure member, when a vehicle acceleration exceeds a predetermined acceleration threshold, to allow the closure member to move and thereby rotate the electric motor in response to a force of inertia of the closure member induced by the vehicle acceleration.

11. The method according to claim 10, wherein the method further comprises the control unit performing the step of
   stopping a motion of the closure member after releasing the control of the electric motor.

12. The method according to claim 10, wherein the method further comprises the control unit performing the step of
   regaining control of the electric motor and thus of the position of the closure member after releasing the control of the electric motor.

13. A computer readable medium having executable instructions for instructing a computer processor to perform a method of operating an open roof assembly, the open roof assembly comprising a moveably arranged closure member for selectively covering or at least partially exposing an opening in a vehicle roof, an electric motor operatively coupled to the closure member for moving the closure member and a control unit operatively coupled to the electric motor, the instructions comprising the control unit performing the steps of     during normal driving conditions, controlling a position of the closure member through a control of the electric motor; and     releasing the control of the electric motor and thus of the closure member, when a vehicle acceleration exceeds a predetermined acceleration threshold, to allow the closure member to move and thereby rotate the electric motor in response to a force of inertia of the closure member induced by the vehicle acceleration.

14. The computer readable medium according to claim 13, wherein the instructions further comprises the control unit performing the step of stopping a motion of the closure member after releasing the control of the electric motor.

15. The computer readable medium product according to claim 13, wherein the instructions further comprises the control unit performing the step of regaining control of the electric motor and thus of the position of the closure member after releasing the control of the electric motor.

* * * * *